(12) United States Patent
Heo et al.

(10) Patent No.: US 9,743,419 B2
(45) Date of Patent: *Aug. 22, 2017

(54) METHOD AND APPARATUS FOR SCHEDULING ASSIGNMENT OF UPLINK PACKET TRANSMISSION IN MOBILE TELECOMMUNICATION SYSTEM

(71) Applicant: Samsung Electronics Co., Ltd., Gyeonggi-do (KR)

(72) Inventors: Youn-Hyoung Heo, Gyeonggi-do (KR); Kyeong-In Jeong, Gyeonggi-do (KR); Ju-Ho Lee, Gyeonggi-do (KR); Sung-Ho Choi, Gyeonggi-do (KR); Yong-Jun Kwak, Gyeonggi-do (KR); Young-Bum Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 126 days.

This patent is subject to a terminal disclaimer.

(21) Appl. No.: 14/851,974

(22) Filed: Sep. 11, 2015

(65) Prior Publication Data

US 2015/0382368 A1     Dec. 31, 2015

Related U.S. Application Data

(63) Continuation of application No. 14/025,168, filed on Sep. 12, 2013, now Pat. No. 9,468,013, which is a
(Continued)

(30) Foreign Application Priority Data

Aug. 26, 2003     (KR) .................. 10-2003-0059172

(51) Int. Cl.
*H04W 72/10* (2009.01)
*H04W 8/24* (2009.01)
(Continued)

(52) U.S. Cl.
CPC ............. *H04W 72/10* (2013.01); *H04W 8/24* (2013.01); *H04W 72/1242* (2013.01);
(Continued)

(58) Field of Classification Search
None
See application file for complete search history.

(56) References Cited

U.S. PATENT DOCUMENTS

| 6,819,930 | B1 |  | 11/2004 | Laroia et al. |
| 8,175,039 | B2 | * | 5/2012 | Heo ..................... H04W 8/24 |
| | | | | 370/329 |

(Continued)

FOREIGN PATENT DOCUMENTS

| EP | 1 209 940 | 5/2002 |
| EP | 1 283 625 | 2/2003 |

OTHER PUBLICATIONS

H. Mine et al., "Delay Analysis of a Satellite Channel Reservation System with Variable Frame Format", IEEE Proc., vol. 130, No. 4, Jun. 1983.
(Continued)

*Primary Examiner* — Donald Mills
(74) *Attorney, Agent, or Firm* — The Farrell Law Firm, P.C.

(57) ABSTRACT

Methods and apparatuses are provided for communication between a UE and a node B in a communication system. The UE generates a media access control protocol data unit (MAC PDU) comprising at least one media access control service data unit (MAC SDU) and at least one field related to an amount of data. Each of the at least one field related to the amount of data corresponds to a respective identifier, and the at least one field related to the amount of data is placed prior to the at least one MAC SDU in the MAC PDU. The MAC PDU comprising the at least one MAC SDU and
(Continued)

the at least one field related to the amount of data is transmitted to the node B. Grant information is received from the node B. Data is transmitted to the node B based on the grant information.

24 Claims, 15 Drawing Sheets

Related U.S. Application Data continuation of application No. 13/444,493, filed on Apr. 11, 2012, now Pat. No. 8,554,240, which is a continuation of application No. 10/925,619, filed on Aug. 25, 2004, now Pat. No. 8,175,039.

(51) Int. Cl.
*H04W 72/12* (2009.01)
*H04W 28/14* (2009.01)

(52) U.S. Cl.
CPC ........ *H04W 72/1284* (2013.01); *H04W 28/14* (2013.01); *H04W 72/1252* (2013.01); *H04W 72/1268* (2013.01)

(56) References Cited

U.S. PATENT DOCUMENTS

| | | | | |
|---|---|---|---|---|
| 8,554,240 | B2* | 10/2013 | Heo | H04W 8/24 455/450 |
| 9,468,013 | B2* | 10/2016 | Heo | H04W 8/24 |
| 2002/0001296 | A1 | 1/2002 | Lee et al. | |
| 2002/0093953 | A1 | 7/2002 | Naim et al. | |
| 2002/0163928 | A1 | 11/2002 | Rudnick et al. | |
| 2003/0016698 | A1* | 1/2003 | Chang | H04L 1/1803 370/469 |
| 2003/0128705 | A1* | 7/2003 | Yi | H04L 1/1841 370/394 |
| 2003/0147371 | A1* | 8/2003 | Choi | H04B 7/2637 370/341 |
| 2004/0013105 | A1 | 1/2004 | Ahmavaara et al. | |
| 2004/0116143 | A1 | 6/2004 | Love et al. | |
| 2004/0228313 | A1 | 11/2004 | Cheng et al. | |
| 2007/0008990 | A1 | 1/2007 | Torsner | |

OTHER PUBLICATIONS

Luigi Musumeci et al., "Polling and Contention-Based Schemes for TDMA-TDD Access to Wireless ATM Networks", IEEE Journal on Selected Areas in Communications, vol. 18, No. 9, Sep. 2000.
3GPP TS 25.321 Version 5.5.0 Release 5 (Published Jun. 2003).

\* cited by examiner

METHOD AND APPARATUS FOR SCHEDULING ASSIGNMENT OF UPLINK PACKET TRANSMISSION IN MOBILE TELECOMMUNICATION SYSTEM

PRIORITY

This application is a Continuation Application of U.S. patent application Ser. No. 14/025,168, filed on Sep. 12, 2013, which is Continuation Application of U.S. patent application Ser. No. 13/444,493, filed on Apr. 11, 2012, now U.S. Pat. No. 8,554,240, issued on Oct. 8, 2013, which is a Continuation Application of U.S. patent application Ser. No. 10/925,619, filed on Aug. 25, 2004, now U.S. Pat. No. 8,175,039, issued on May 8, 2012, which claims priority to an application filed in the Korean Intellectual Property Office on Aug. 26, 2003 and assigned Serial No. 10-2003-0059172, the contents of which are incorporated herein by reference.

BACKGROUND OF THE INVENTION

1. Field of the Invention

The present invention relates to a mobile telecommunication system, and more particularly to a method and an apparatus for efficiently transceiving scheduling assignment information for transmitting packet data through an uplink (UL).

2. Description of the Related Art

An asynchronous Wideband Code Division Multiple Access (hereinafter, referred to as a WCDMA) communication system employs an Enhanced Uplink Dedicated Channel (hereinafter, referred to as an EUDCH or E-DCH) in order to support a high speed packet data service through an uplink. The EUDCH is a channel proposed to improve the performance of a packet transmission in an uplink communication in an asynchronous code division multiple access communication system. The EUDCH-related technology includes new technologies for a more reduced Transmission Time Interval (TTI) together with the Adaptive Modulation and Coding (AMC) method and the Hybrid Automatic Retransmission Request (HARD) method already used in a High Speed Downlink packet access (HSDPA). Further, a Node B control scheduling of an uplink channel is used. The Node B control scheduling for the uplink is very different from a scheduling for a downlink.

Since uplink signals transmitted from a plurality of user equipments (hereinafter, referred to as UEs) do not maintain orthogonality between the uplink signals, the uplink signals function as interference signals between themselves. Therefore, as the number of uplink signals received in the Node B increase, the number of interference signals for uplink signals transmitted from a specific UE also increases. Accordingly, as the number of the interference signals with respect to the uplink signals transmitted from the specific UE increases, the reception performance of the Node B is reduced. In order to overcome such a problem, uplink transmission power may be increased. However, an uplink signal having increased transmission power also functions as an interference signal with respect to another signal. Accordingly, the Node B limits the number of a receivable uplink signals while ensuring its own reception performance. Equation (1) represents the number of the receivable uplink signal while the reception performance of the Node B is ensured.

$$ROT = \frac{I_o}{N_o} \tag{1}$$

In Equation (1), $I_o$ represents an entire reception wideband power spectral density of the Node B and $N_o$ represents a thermal noise power spectral density of the Node B. Accordingly, the ROT is a radio resource capable of being assigned by the Node B for the EUDCH packet data service in an uplink.

FIGS. 1A and 1B show variations of an uplink radio resource assigned by a Node B. As shown in FIGS. 1A and 1B, the uplink radio resource assigned by the Node B is obtained by the sum of inter-cell interference (hereinafter, referred to as an ICI), voice traffic, and EUDCH packet traffic.

FIG. 1A shows variation of the total ROT when Node B scheduling is not used. Since scheduling is not performed for the EUDCH packet traffic, the total ROT grows larger than a target ROT when a plurality of UEs transmit the packet data at a high data rate at the same time. Herein, the reception performance of the uplink signal is reduced.

FIG. 1B shows variation of the total ROT when Node B scheduling is used, thereby preventing the multiple UEs from transmitting the packet data at a high data rate at the same time. That is, the Node B scheduling enables a high data rate to be permitted to a specific UE and a low data rate to be permitted to other UEs, thereby preventing the total ROT from exceeding the target ROT. Accordingly, Node B scheduling can always maintain constant reception performance.

The Node B notifies each UE of information regarding whether or not EUDCH data can be transmitted by means of a request data rate of UEs using the EUDCH or channel status information representing transmission quality of an uplink. Also, the Node B adjusts the EUDCH data rate. Further, in order to improve the performance of a mobile communication system, the Node B scheduling assigns the data rate to the UEs so that the total ROT of the Node B does not exceed the target ROT. For example, the Node B may assign a low data rate to a UE in a position remote from the Node B and a high data rate to a UE in a position near to the Node B.

FIG. 2 is a view illustrating a basic concept regarding circumstances in which a Node B scheduling is used in an EUDCH. In FIG. 2, Node B 200 supports the EUDCH and reference numerals 210, 212, 214, and 216 represent UEs transmitting the EUDCH. When a data rate of a certain UE increases, reception power received in the Node B 200 from the UE increases. Accordingly, a ROT of the UE occupies a large portion of the total ROT. In contrast, when a data rate of another UE is reduced, reception power received in the Node B 200 from another UE is reduced. Accordingly, a ROT of another UE occupies a small portion of the total ROT. The Node B 200 performs the Node B scheduling for the EUDCH packet data in consideration of the relation between the data rates and a radio resource requested by the UEs 210, 212, 214, and 216.

In FIG. 2, the UEs 210, 212, 214, and 216 transmit the packet data with different uplink transmission powers from each other according to the distance between the Node B 200 and the UEs 210, 212, 214, and 216. UE 210, in the furthest position from the Node B 200, transmits the packet data with the highest transmission power 220 of an uplink channel. In contrast, UE 214, in the nearest position to the Node B 200, transmits the packet data with the lowest transmission power 224 of an uplink channel. In order to improve the performance of a mobile communication system while maintaining the total ROT and reducing an ICI for another cell, the Node B performs scheduling so that the transmission power intensity of the uplink channel is inversely proportional to the data rate, thereby assigning a relatively lower data rate to the UE 210 having the highest transmission power of an uplink channel and a relatively higher data rate to the UE 214 having the lowest transmission power of an uplink channel.

FIG. 3 is a flow diagram illustrating a basic transmission/reception procedure between a UE 302 transmitting an EUDCH and a Node B 301 including the UE 302.

In step 303, a setup of an EUDCH is accomplished between the Node B 301 and the UE 302. The setup step includes a transmission step of messages through a dedicated transport channel. When the EUDCH setup is accomplished, the UE 302 informs the Node B 301 of scheduling information at step 304. The scheduling information may include UE transmission power information enabling uplink channel information to be understood, extra information of transmission power capable of being transmitted by a UE, and the amount of data stored in a buffer of a UE that must be transmitted.

In step 311, the Node B 301 monitors the scheduling information of the UE 302 and schedules the UE 302. When the Node B 301 determines to permit an uplink data transmission to the UE 302 in step 311, the Node B 301 transmits scheduling assignment information containing an assigned data rate and a transmission timing to the UE 302 in step 305. In step 312, the UE 302 determines a Transport Format (TF) such as a data rate for a EUDCH transmission based on the scheduling assignment information and chooses a Transport Format Resource Indicator (TFRI) indicating the TF. In step 307, the UE 302 transmits EUDCH data by means of the TFRI. Further, the TFRI, which is related information representing the TF of the EUDCH data, is transmitted to the Node B 301 in step 306 together with the EUDCH data. In step 313, the Node B 301 determines whether or not an error exists in the TFRI and the EUDCH data. As a result of the determination, when the error exists in at least one of the TFRI and the EUDCH data, the Node B 301 transmits an NACK to the UE 302 through an ACK/NACK channel, in step 308. In contrast, when any error does not exist in the TFRI and the EUDCH data, the Node B 301 transmits an ACK to the UE 302 through an ACK/NACK channel, in step 308.

The Node B 301 decides a data rate to be assigned to a UE on the basis of the scheduling information. Herein, the Node B 301 assigns a proper data rate and transmission timing to multiple UEs using an EUDCH. Further, in the scheduling, the Node B 301 assigns a resource to each UE in order to prevent a ROT value of an uplink from exceeding a target ROT value. Herein, the Node B 301 assigns many resources to a UE having a good channel condition in order to improve the entire performance of a system.

FIG. 4 is a view showing the types of data transmitted from a UE to a Node B for an uplink packet data service.

As shown in FIG. 4, a UE 400 can transmit voice and image traffic, packet data, data regarding a game, etc., to a Node B 402 through an EUDCH. The data transmitted from the UE as described above requires different quality of service (QoS) according to the types of the data. Accordingly, it is necessary to provide a method by which the Node B 402 performs a scheduling and assigns a radio resource according to quality of service required by data to be transmitted from a UE.

SUMMARY OF THE INVENTION

Accordingly, the present invention has been made to solve the above-mentioned problems occurring in the prior art, and it is an object of the present invention is to provide a method and an apparatus for assigning a radio resource according to quality of service required by data to be transmitted.

It is another object of the present invention is to provide a method and an apparatus for assigning many radio resources with respect to data requesting high quality of service and a few radio resources with respect to data requesting low quality of service.

It is further object of the present invention is to provide a method and an apparatus for efficiently using a radio resource of a mobile communication system by assigning radio resources different from each other according to quality of service.

According to one aspect of the present invention, a method is provided for communication between a UE and a node B in a communication system. The UE generates a media access control protocol data unit (MAC PDU) comprising at least one media access control service data unit (MAC SDU) and at least one field related to an amount of data. Each of the at least one field related to the amount of data corresponds to a respective identifier, and the at least one field related to the amount of data is placed prior to the at least one MAC SDU in the MAC PDU. The MAC PDU comprising the at least one MAC SDU and the at least one field related to the amount of data is transmitted to the node B. Grant information is received from the node B. Data is transmitted to the node B based on the grant information.

According to an aspect of the present invention, a method for communication between a UE and a node B in a communication system. The node B receives a MAC PDU comprising at least one MAC SDU and at least one field related to an amount of data. Each of the at least one field related to the amount of data corresponds to a respective identifier, and the at least one field related to the amount of data is placed prior to the at least one MAC SDU in the MAC PDU. Grant information is transmitted to the UE. Data transmitted from the UE based on the grant information is received.

According to an aspect of the present invention, an apparatus of a UE is provided for communication in a communication system. The apparatus includes a data unit generator configured to generate a MAC PDU comprising at least one MAC SDU and at least one field related to an amount of data. Each of the at least one field related to the amount of data corresponds to a respective identifier, and the at least one field related to the amount of data is placed prior to the at least one MAC SDU in the MAC PDU. The apparatus also includes a transmission unit configured to transmit the MAC PDU comprising the at least one MAC SDU and the at least one field related to the amount of data to a node B, and transmit data to the node B based on grant information received from the node B.

According to an aspect of the present invention, an apparatus of a node B is provided for communication in a communication system. The apparatus includes a transmission unit configured to transmit grant information to a UE. The apparatus also includes a reception unit configured to receive a MAC PDU comprising at least one MAC SDU and at least one field related to an amount of data. Each of the at least one field related to the amount of data corresponds to a respective identifier, and the at least one field related to the amount of data is placed prior to the at least one MAC SDU in the MAC PDU. The reception unit is also configured to receive data transmitted from the UE based on the grant information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, a preferred embodiment according to the present invention will be described with reference to the accompanying drawings. In the following description of the present invention, a detailed description of known functions and configurations incorporated herein will be omitted when it may make the subject matter of the present invention unclear.

A Universal Mobile Telecommunication Service (hereinafter, referred to as a UMTS), one of the $3^{rd}$ Generation Partnership Project (3GPP) mobile communication services, is based on a communication standard of a Global System for Mobile Communication (hereinafter, referred to as a GSM) and a General Packet Radio Service (GPRS) employs a wideband CDMA technology, in contrast to the GSM employing a Time Division Multiple Access (TDMA). A UMTS Terrestrial Radio Access Network (hereinafter, referred to as a UTRAN) includes Node Bs containing a plurality of cells and a Radio Network Controller (hereinafter, referred to as a RNC) managing radio resources of the Node Bs.

An interface between a UE and a RNC is called an Uu interface and is classified as a control plane for exchanging control and signaling signals and a user plane for transmitting data traffic. The control plane includes a radio resource control (RRC) layer, a radio link control (RLC) layer, a media access control (MAC) layer, and a physical (hereinafter, referred to as a PHY) layer. Further, the user plane includes a packet data control protocol (PDCP) layer, an RLC layer, a MAC layer, and a PHY layer. Herein, the PHY layer is located in each cell and the layers between a MAC layer and a RRC layer are located in a RNC.

Particularly, a portion related to a user plane in a MAC layer is called a MAC-d and a portion related to a control plane is called a MAC-c. User data to be transmitted through a dedicated transport channel is generated into a transmission block having a desired size through a MAC-d layer. When the user data is transmitted through an EUDCH, the transmission block passes through a MAC-eu portion in the MAC layer. A MAC-eu layer performs a process a Node B control scheduling, HARQ, etc., for an EUDCH before transmitting data sent from a MAC-d layer to a PHY layer.

Figure 1A:
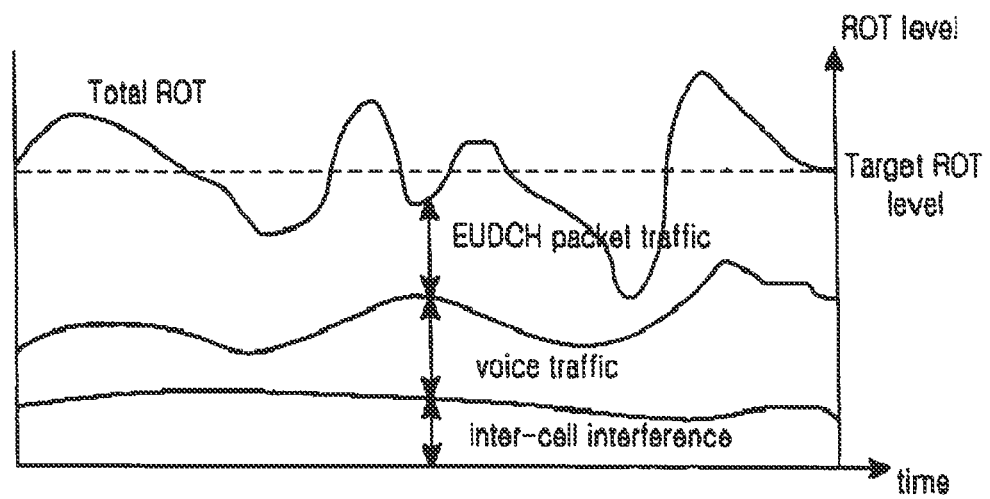
FIG. 1A is a view showing variations of an uplink radio resource of a Node B when a Node B control scheduling is not used.
Figure 1B:
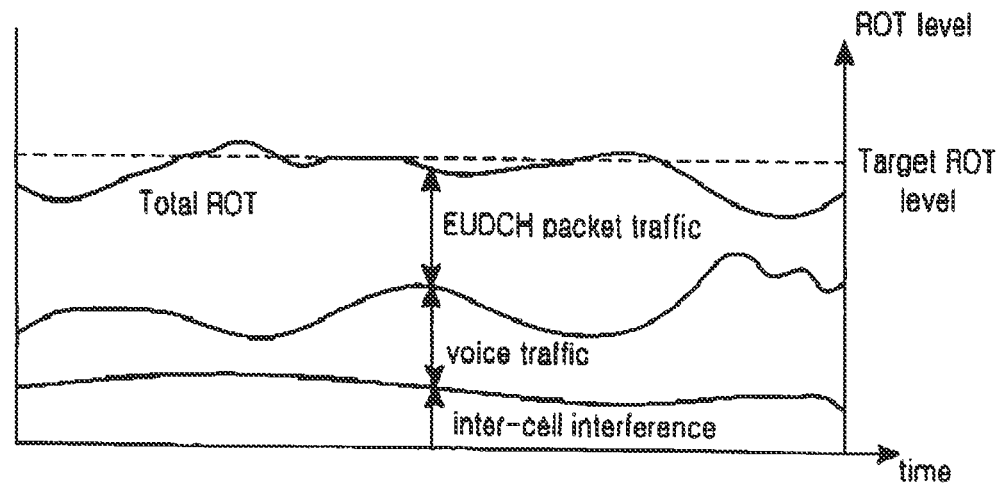
FIG. 1B is a view showing variations of an uplink radio resource of a Node B when a Node B control scheduling is used.
Figure 2:
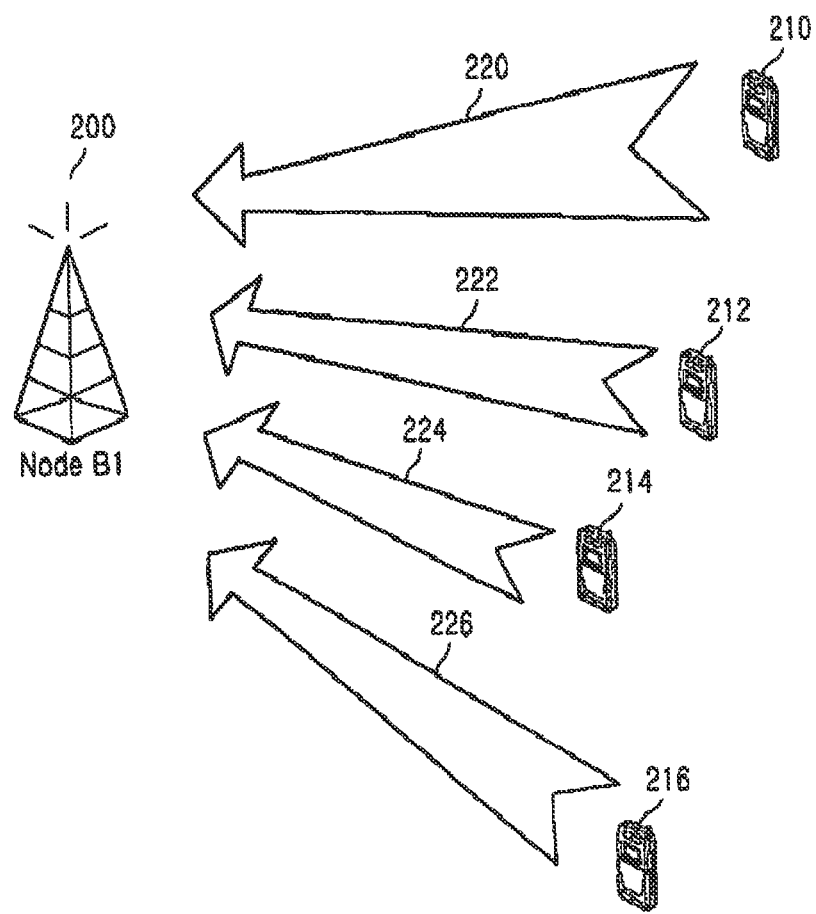
FIG. 2 is a view illustrating a UE and a Node B performing uplink packet transmission.
Figure 3:
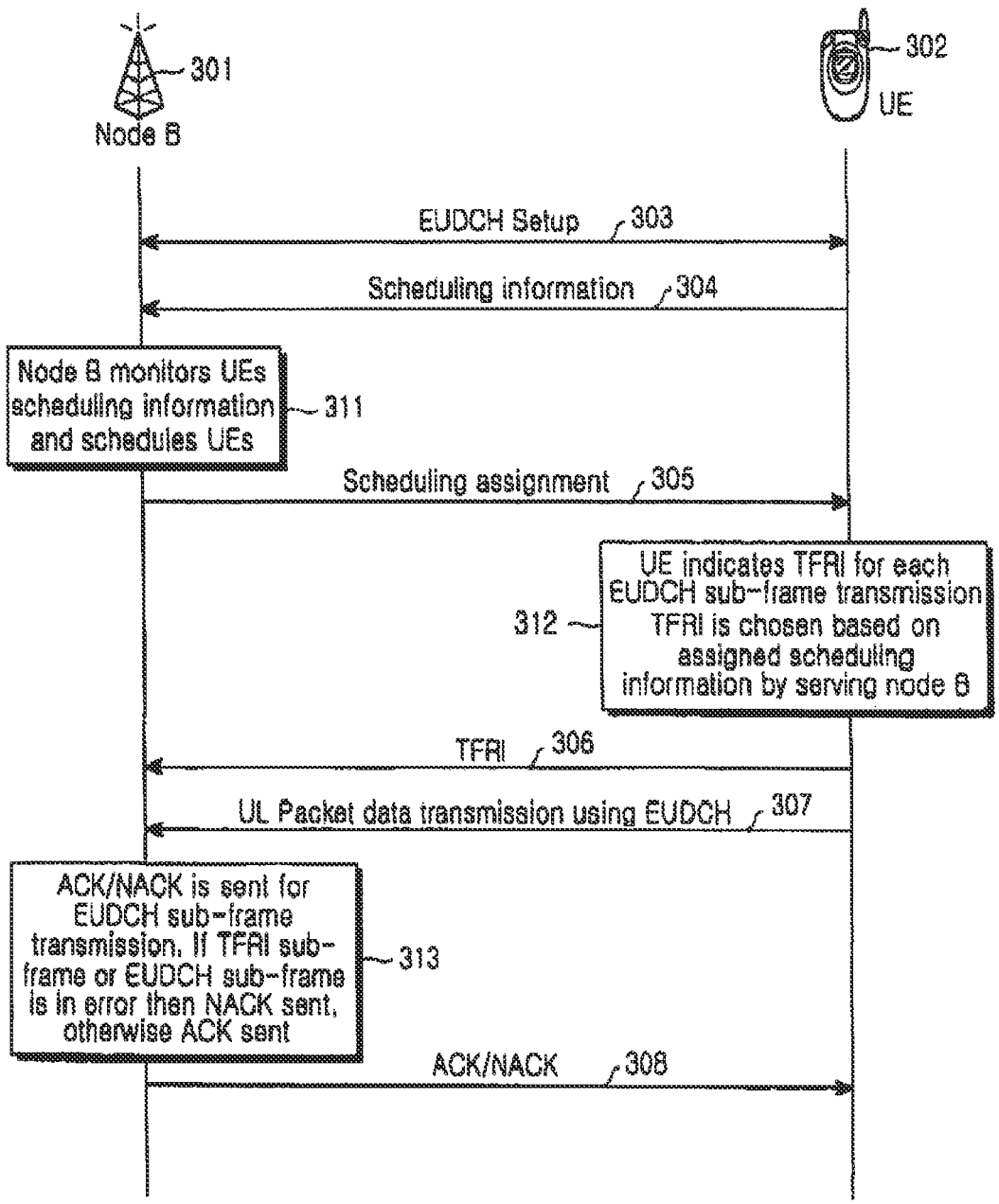
FIG. 3 is a view showing information exchanged between a UE and a Node B in order to perform uplink packet transmission.
Figure 4:
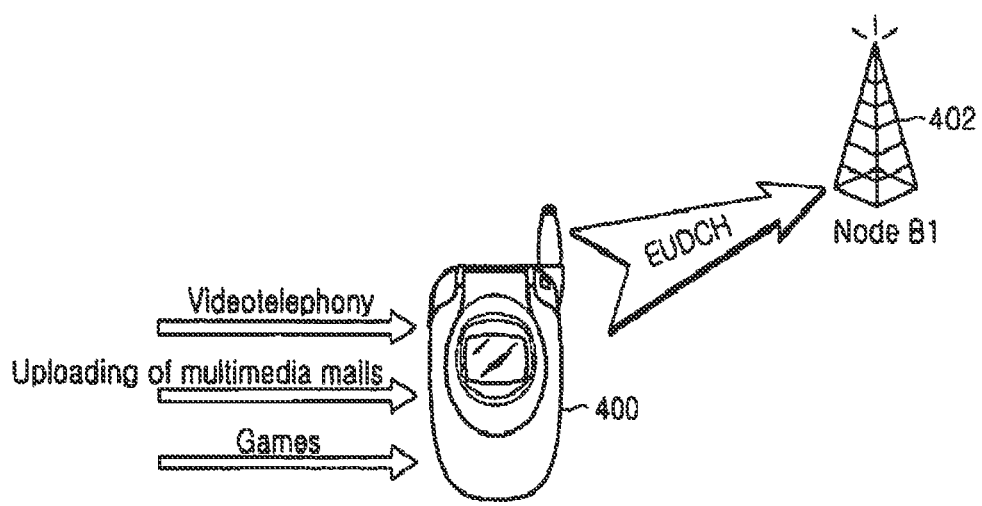
FIG. 4 is a view showing the types of data transmitted from a UE to a Node B for an uplink packet data service.
Figure 5:
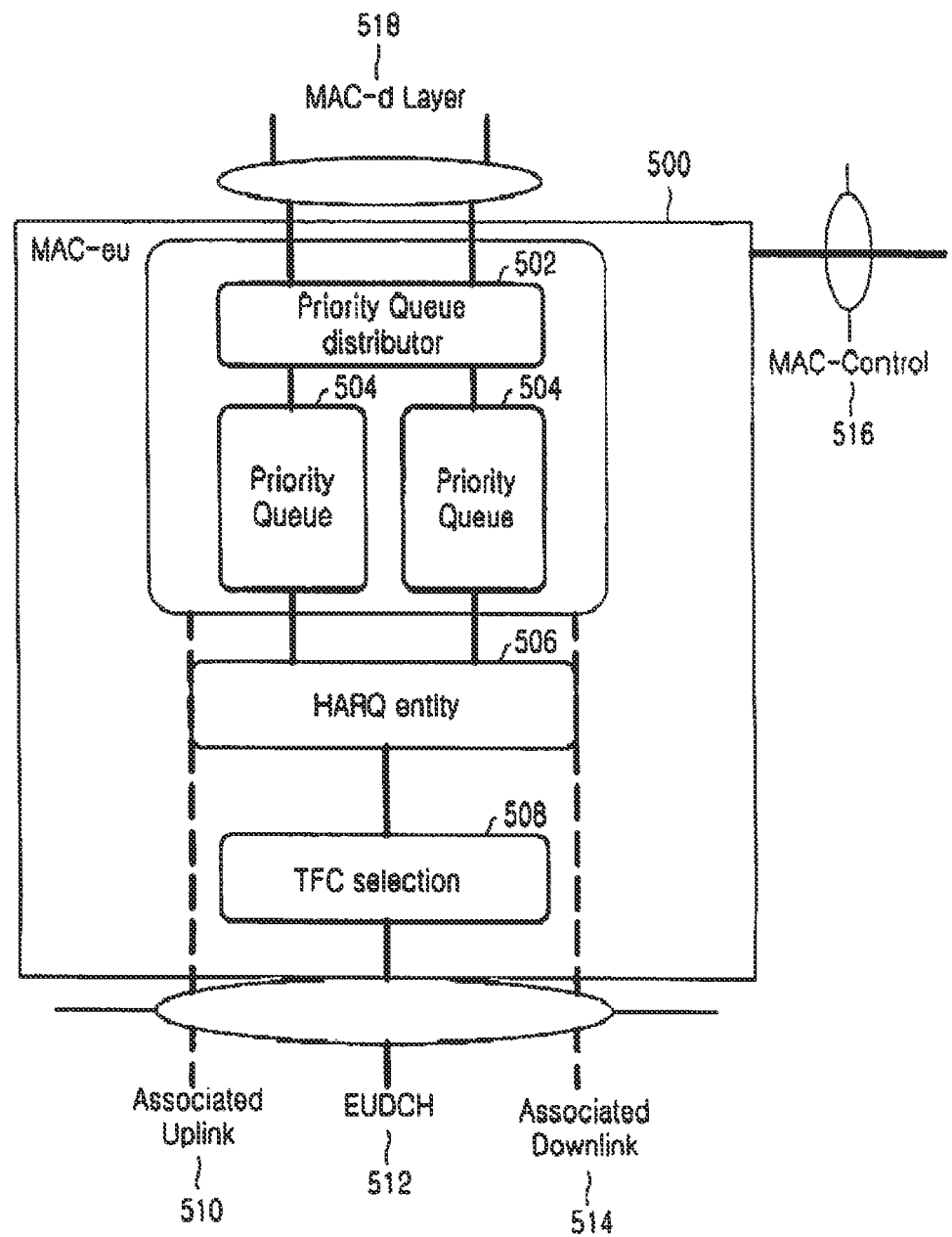
FIG. 5 is a view showing a structure of a logical layer of a UE according to a preferred embodiment of the present invention.

FIG. 5 is a view showing a structure of a MAC-eu layer of a UE transmitting an EUDCH according to a preferred embodiment of the present invention.

The MAC-eu layer 500 of the UE includes a priority queue distributor 502 and a priority queues (PQs) 504, and receives data to be transmitted to a Node B from a MAC-d layer 518. The received data is sent to the priority queue distributor 502 of the MAC-eu layer 500. The priority queue distributor 502 determines a priority for the received data and buffers the data in a priority queue, which corresponds to the determined priority, from among the priority queues 504.

The priority queues 504 are used in storing data according to a priority of a service to be provided and have inherent queue identifiers (hereinafter, referred to as QIDs) respectively. That is, each of the priority queues 504 is related to at least one service and stores data having different priorities. FIG. 5 shows two priority queues 504, but the number of the priority queues 504 is randomly determined by a MAC control signal 516 according to the type and number of services being provided. That is, when a priority for data to be transmitted to the Node B is classified as multiple steps, the number of the priority queues 504 increases. The priority is determined according to a transmission time point (i.e., required delay) at which data is to be transmitted to the Node B. That is, data which must be transmitted to the Node B within a rapid time period has a high priority, and data which does not have the necessity of being transmitted to the Node B within a rapid time period has a low priority.

The priority queue distributor 502 determines a priority for the received data and sends the data to one of the priority queues 504 according to the determined priority. In this way, data having the same priority is sent to the same priority queue. The priority queues 504 store the received data before a resource is assigned by the scheduling of the Node B.

In order to request a scheduling assignment from the Node B, the MAC-eu layer 500 transmits scheduling information, which contain a buffer status representing the amount of the data stored in the priority queues 504 and a channel status representing the transmission quality of an uplink, through an EUDCH related uplink 510. When the Node B transmits scheduling assignment information to the UE through an EUDCH related downlink 514, a Transport format combination (hereinafter, referred to as a TFC) selection part 508 determines a TFC by means of the scheduling assignment information, reads the data from the priority queues 504 by means of the determined TFC, and transmits the read data through an EUDCH 512. Herein, the UE first transmits data having a high priority stored in the priority queues 504. Therefore, a transmission time can be differently designated according to the priority. Meanwhile, an HARQ entity 506 interprets an ACK/NACK received through the related downlink 514 with respect to the transmitted data, discards data stored in a corresponding priority queue when an ACK is received, and retransmits data stored in a corresponding priority queue when an NACK is received.

Figure 6:
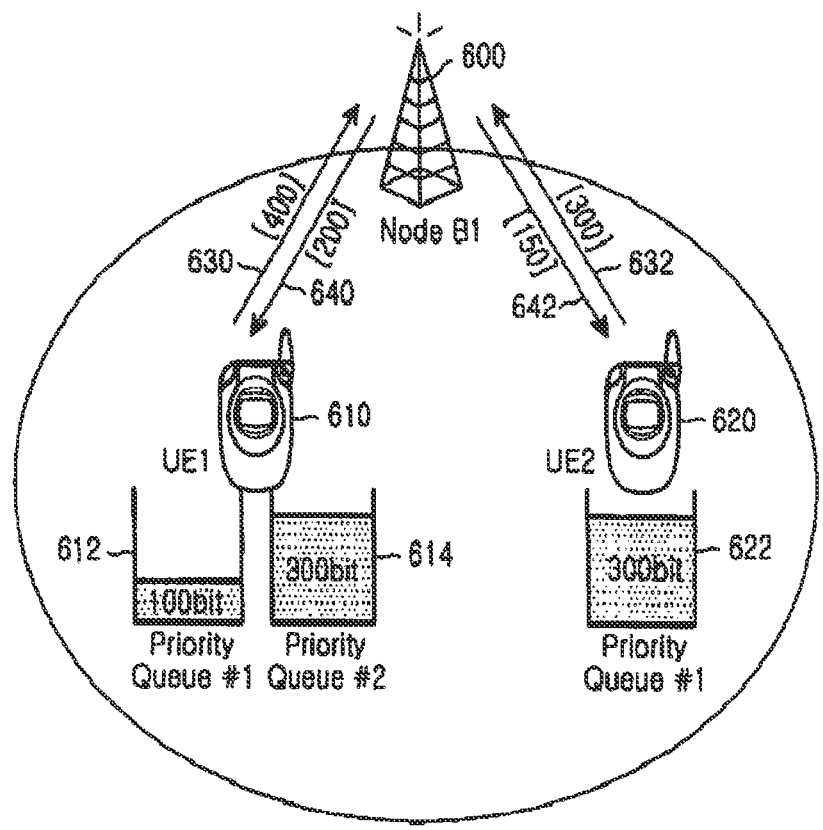
FIG. 6 is a view illustrating transmission/reception of scheduling assignment information between a UE and a Node B according to one embodiment of the present invention.

FIG. 6 is a view illustrating an operation by which two UEs request a scheduling assignment to a Node B according to one embodiment of the present invention.

In FIG. 6, the UE 610 includes two priority queues 612 and 614 and the UE 620 includes one priority queue 622. The priority queue 612 of the UE 610 has a priority higher than that of the priority queue 614, and the priority queue 622 of the UE 620 has the same priority as that of the priority queue 612 of the UE 610. The priority queue 612 of the UE 610 stores 100 bits of data, the priority queue 614 of the UE 610 stores 300 bits of data, and the priority queue 622 of the UE 620 stores 300 bits of data. The Node B 600 has a radio resource capable of receiving only 450 bits of data.

Referring to FIG. 6, the UEs 610 and 620 transmit buffer status information 630 and 632 representing the amount of data to be transmitted to the Node B 600. That is, the UE 610 transmits the buffer status information 630 corresponding to 400 bits to the Node B 600, and the UE 620 transmits the buffer status information 632 corresponding to 300 bits to the Node B 600. Herein, when uplink channel conditions of the UEs 610 and 620 are identical to each other, the Node B 600 transmits scheduling assignment information 640, which enables only 200 bits to be transmitted, to the UE 610, and scheduling assignment information 642, which enables only 150 bits to be transmitted, to the UE 620.

The UE 610 determines a TFC by means of the scheduling assignment information 640, transmits data through an EUDCH by means of the determined TFC. That is, according to a priority, 100 bits of data on standby in the priority queue 612 are first transmitted, and then 100 bits of data on standby in the priority queue 614 are transmitted. The UE 620 also determines a TFC by means of the scheduling assignment information 642, transmits data through an EUDCH by means of the determined TFC. That is, 150 bits of data on standby in the priority queue 622 are transmitted.

Herein, although the priority queue 612 of the UE 620 has a priority higher than that of the priority queue 614 of the UE 610, all data in the standby state are not transmitted. That is, when there exists one UE requesting the scheduling assignment information to the Node B 600, data in the standby state are transmitted according to priority. However, when there exists two or more UEs requesting the scheduling assignment information to the Node B 600, there occurs a problem in that data having a higher priority are transmitted later than data having a low priority.

Figure 7:
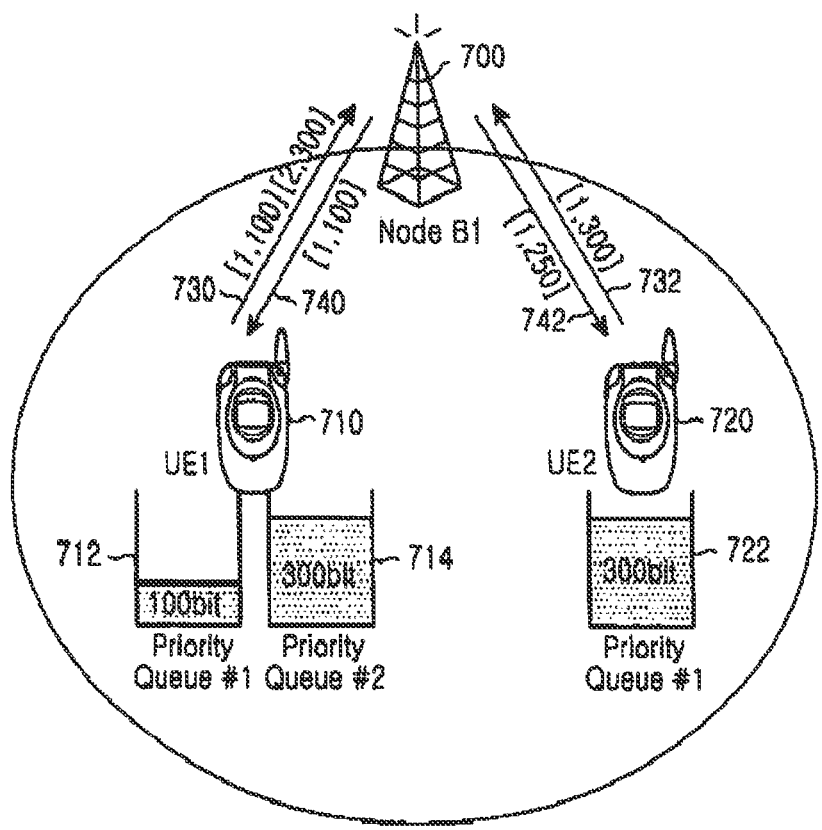
FIG. 7 is a view illustrating transmission/reception of scheduling assignment information between a UE and a Node B according to another embodiment of the present invention.

FIG. 7 is a view illustrating a preferred embodiment of the present invention for solving the problem in FIG. 6. In FIG. 7, UEs 710 and 720 transmit not only the amount of data but also information on a priority to a Node B 700 at the same time.

Referring to FIG. 7, the UE 710 includes two priority queues 712 and 714 and the UE 720 includes one priority queue 722. The priority queue 712 of the UE 710 has a priority higher than that of the priority queue 714, and the priority queue 722 of the UE 720 has the same priority as that of the priority queue 712 of the UE 710. The priority queue 712 of the UE 710 stores 100 bits of data, the priority queue 714 of the UE 710 stores 300 bits of data, and the priority queue 722 of the UE 720 stores 300 bits of data.

The UEs 710 and 720 transmit buffer status information 730 and 732 containing the amount of data to be transmitted and information on a priority to the Node B 700. That is, the UE 710 transmits the buffer status information 730 containing the amount of data corresponding to 400 bits and a QID representing a priority to the Node B 700. That is, the buffer status information 730 signifies that the amount of data corresponding to a Priority 1 is 100 bits and the amount of data corresponding to a Priority 2 is 300 bits. Further, the UE 720 transmit the buffer status information 732 containing the amount of data corresponding to 300 bits and a QID representing a priority to the Node B 700. Herein, when uplink channel conditions of the UEs 710 and 720 are identical to each other, the Node B 700 transmits scheduling assignment information 740 and 742 to the UEs 710 and 720 in consideration of the priority. That is, the Node B 700 transmits scheduling assignment information 740, which enables only 100 bits to be transmitted, to the UE 710, and scheduling assignment information 742, which enables only 250 bits to be transmitted, to the UE 720.

The UE 710 determines a TFC by means of the scheduling assignment information 740, transmits data through an EUDCH by means of the determined TFC. That is, 100 bits of data on standby in the priority queue 712 are transmitted according to priority. The UE 720 also determines a TFC by means of the scheduling assignment information 742, transmits data through an EUDCH by means of the determined TFC. That is, 250 bits of data on standby in the priority queue 722 are transmitted. In this way, the UEs 710 and 720 can first transmit data having a high priority.

Figure 8:
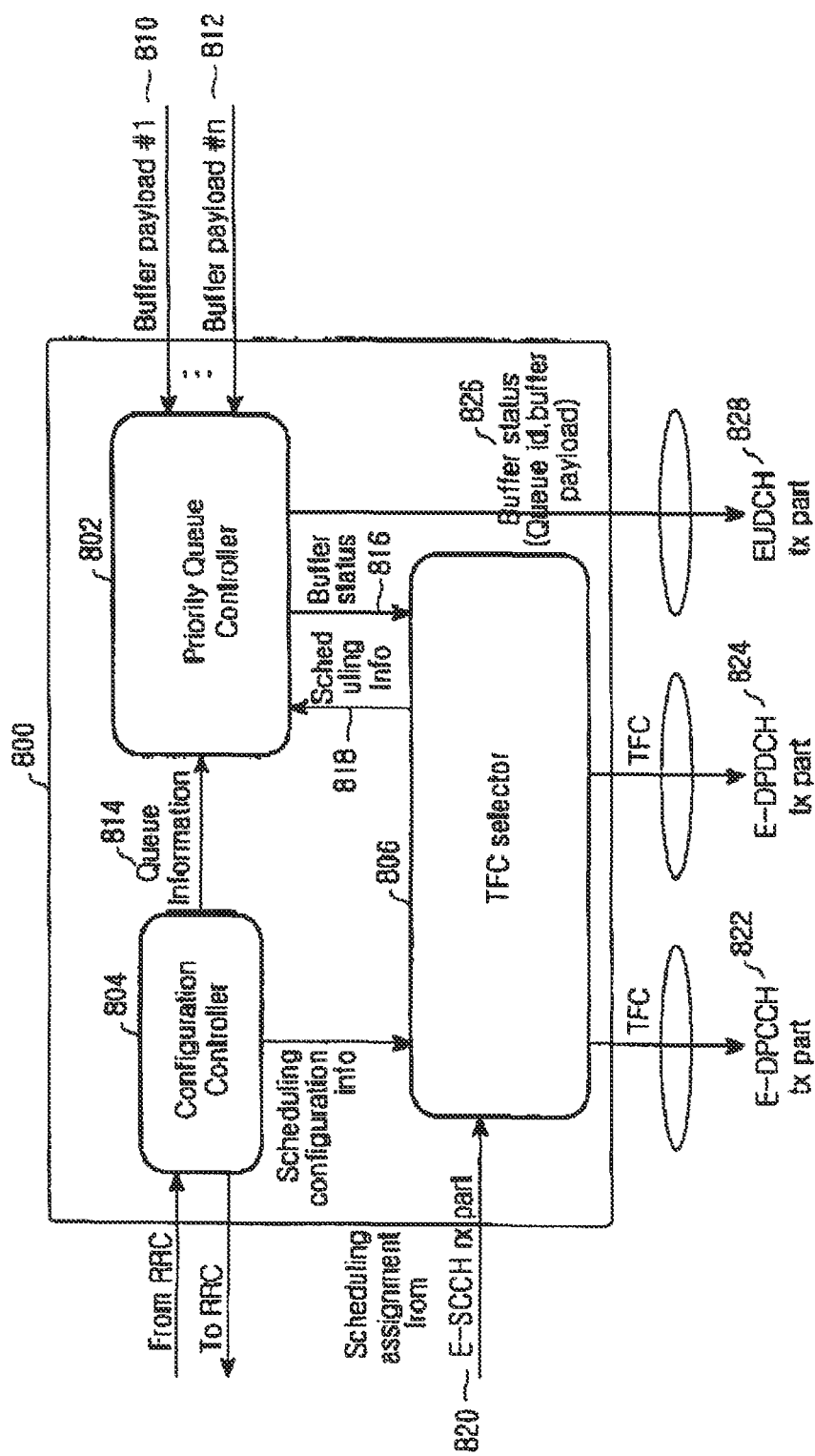
FIG. 8 is a view showing a structure of a logical layer of a UE according to a preferred embodiment of the present invention.

FIG. 8 is a view showing a structure of a MAC-eu scheduling controller of a UE according to a preferred embodiment of the present invention. Referring to FIG. 8, the scheduling controller 800 includes a configuration controller 804, a priority queue (PQ) controller 802, and a TFC selector 806. The priority queue controller 802 receives buffer payload information 810 and 812 from priority queues, and the buffer payload information 810 and 812 represent the amount of data on standby in each priority queue. In FIG. 8, it is assumed that N number of priority queues exist. The buffer payload information 810 represents buffer payload information sent from a priority queue 1 and the buffer payload information 812 represents buffer payload information sent from a priority queue n. Further, the priority queue controller 802 receives queue information 814 from the configuration controller 804. Herein, the queue information 814 is configuration information of priority queues, and it is related to the sizes and the number of memories of priority queues.

The priority queue controller 802 transmits a buffer status information 826 containing a QID regarding a priority of a corresponding buffer payload information 810 and 812 to the Node B through an EUDCH tx part 828.

The TFC selector 806 receives scheduling assignment information 820 through a shared control channel for EUDCH (E-SCCH), a buffer status information 816 about priority queues from the priority queue controller 802, and scheduling configuration information from the configuration controller 804. The scheduling configuration information contains priorities of priority queues, transport format combination set, etc. The TFC selector 806 determines a TFC by means of the buffer status information 816 and the scheduling assignment information 820. The TFC is determined so that data stored in a priority queue having a high priority is first transmitted.

The TFC selector 806 transmits the determined TFC to a dedicated physical data channel for EUDCH (hereinafter, referred to as a E-DPDCH) tx part 824. The E-DPDCH tx part 824 transmits EUDCH packet data by means of the received TFC. Herein, the determined TFC is transmitted to a dedicated physical control channel for EUDCH (hereinafter, referred to as a E-DPCCH) tx part 822. The E-DPCCH tx part 822 transmits control information containing the TFC together with the EUDCH packet data at the same time point. Also, the TFC is transmitted to the priority queue controller 802 over a scheduling information 818. The priority queue controller 802 understands by means of the TFC the priority queue in which transmitted data has been in a standby state by means of the TFC, and renews the buffer status of the priority queues.

Figure 9:
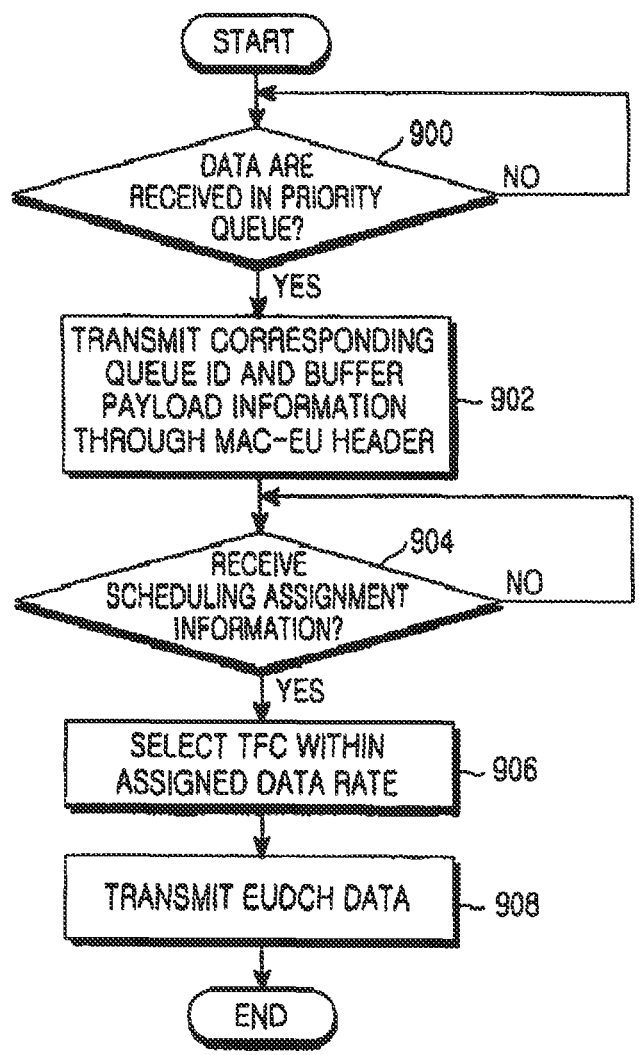
FIG. 9 is a flowchart illustrating an operation performed in a structure of a logical layer of a UE according to a preferred embodiment of the present invention.

FIG. 9 is a flowchart illustrating an operation of a MAC-eu scheduling controller according to a preferred embodiment of the present invention.

Referring to FIG. 9, in step 900, the scheduling controller determines whether or not new data has arrived at priority queues by buffer payload information sent from priority queues. Further, the scheduling controller determines a priority queue from which the buffer payload information has been transmitted, thereby understanding the amount and priority of data transmitted to the priority queues. When the new data has arrived at the priority queues, step 902 is performed. In contrast, when the new data has not arrived at the priority queues, the process returns to step 900.

In step 902, the scheduling controller transmits buffer status information containing the buffer payload information and buffer status information containing a QID representing a priority relating to the buffer payload information to a Node B.

In step 904, the scheduling controller determines whether or not scheduling assignment information is received from the Node B. The scheduling assignment information contains information on a maximum data rate capable of being used by a UE and a permission timing. From the result of the determination, when the scheduling assignment information has been received from the Node B, step 906 is performed. In contrast, when the scheduling assignment information has not been received from the Node B, the process returns to step 904.

In step 906, the scheduling controller determines a TFC within a data rate assigned by the scheduling assignment information. In determining the TFC, the scheduling controller enables data having a high priority to be first transmitted in consideration of the priority of the data transmitted to the priority queues. In step 908, the scheduling controller controls the data transmitted to the priority queues to be transmitted by means of the determined TFC. The MAC-eu layer generates a MAC-eu protocol data unit (PDU) containing data read from a corresponding priority queue by the control command of the scheduling controller, and transmits the generated MAC-eu PDU through the E-DPDCH. Further, the scheduling controller transmits the determined TFC through the E-DPCCH, and renews information on the changed buffer status. The renewed buffer status is transmitted through an EUDCH.

Figure 10:
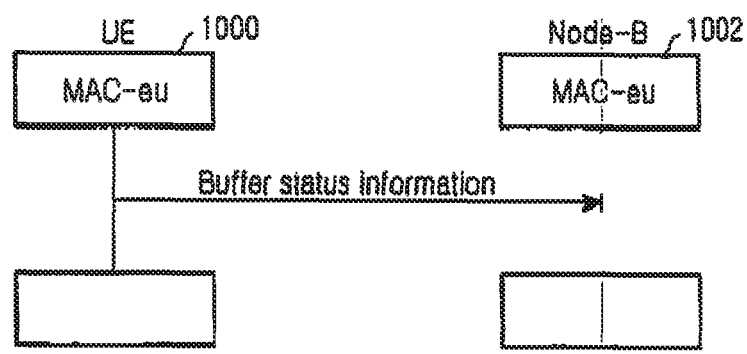
FIG. 10 is a view illustrating an operation by which buffer status information is transmitted from a logical layer of a UE to a logical layer of a Node B according to a preferred embodiment of the present invention.

FIG. 10 is a view illustrating a MAC-eu signaling between a UE and a Node B according to a preferred embodiment of the present invention. As shown in FIG. 10, the MAC-eu layer 1000 of the UE transmits a buffer status message to the MAC-eu layer 1002 of the Node B. The buffer status information contains a QID and a buffer payload of a priority queue as described above.

Figure 11:
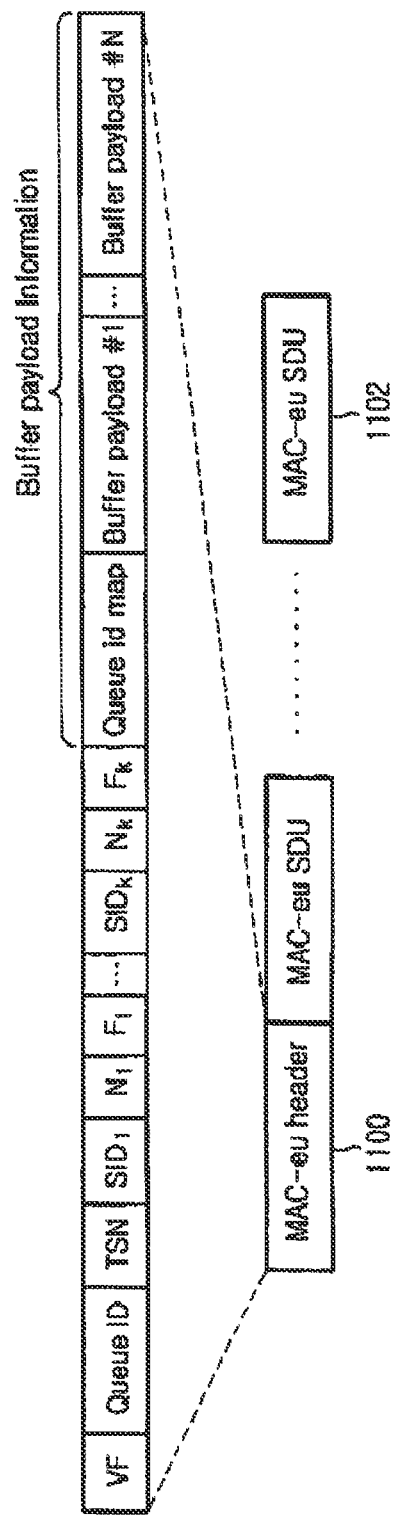
FIG. 11 is a view showing a structure of an EUDCH transmitting a buffer status information of a UE according to a preferred embodiment of the present invention.

FIG. 11 is a view showing a construction of a MAC-eu PDU containing buffer status information according to a preferred embodiment of the present invention. As shown in FIG. 11, the MAC-eu PDU includes a MAC-eu header 1100 contained in a header part and a plurality of MAC-eu service data units 1102 (SDUs) contained in a payload part. Information contained in the MAC-eu header 1100 is as follows:

A version flag (VF) representing the version of a MAC-eu PDU format.

A QID identifying of a priority queue from which a MAC-eu SDU is outputted, constructed of 3 bits.

A transmission sequence number (TSN) for realigning a MAC-eu SDU according to a priority, constructed of 5 to 6 bits.

An SID_k representing the size of MAC-d SDUs belonging to an $x^{th}$ MAC-eu SDU set from among the sets of the MAC-d SDUs constituting a MAC-eu PDU, constructed of 2 to 3 bits.

An N_k representing the number of MAC-d PDUs belonging to a MAC-eu SDU set, constructed of 7 bits.

A flag (F). When flag (F) is set to 1, the next field is a MAC-eu PDU. When F (flag) is set to 0, the next field is an SID.

A QID map representing an identifier of a priority queue in which data exists, and a bit number is assigned for as many as the number of priority queues. A numeral 1 represents existence of data and a numeral 0 represents absence of data.

A buffer payload represents the size of data stored in priority queues in which the value of the QID map is 1, and a bit number according to the length of the QID map is assigned.

Figure 12:
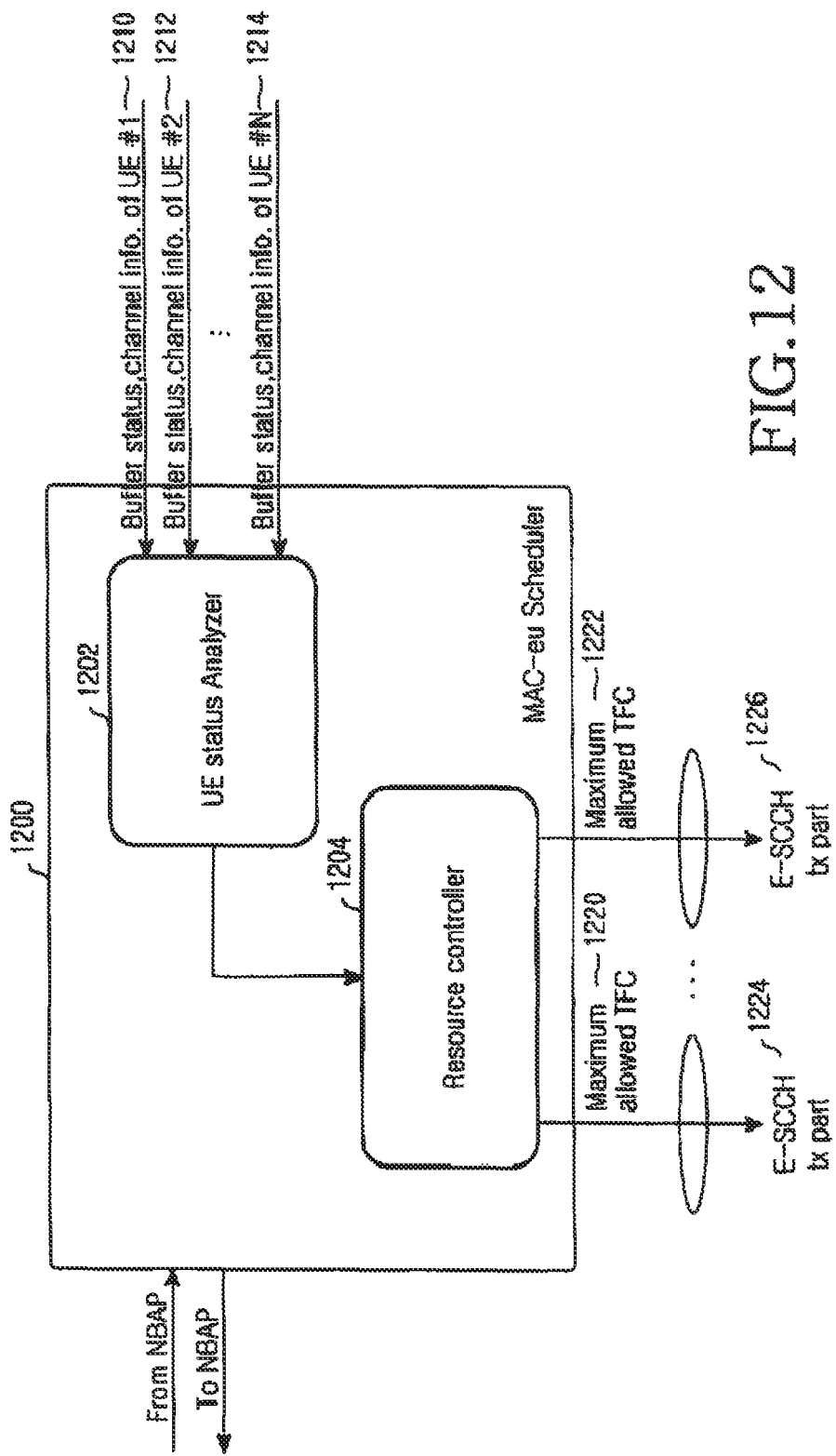
FIG. 12 is a view showing a structure of a logical layer of a Node B according to a preferred embodiment of the present invention.

FIG. 12 is a view showing a structure of a MAC-eu scheduler of a Node B according to a preferred embodiment of the present invention.

Referring to FIG. 12, the scheduler 1200 includes a UE status analyzer 1202 and a resource controller 1204. The UE status analyzer 1202 receives buffer status messages and channel status messages 1210, 1212, and 1214 of UEs UE#1 to UE#N located in a cell area managed by the Node B. The UE status analyzer 1202 receives buffer status information according to a priority queue contained in a MAC-eu header of a MAC-eu PDU transmitted from each UE and estimates the amount of data stored in a priority queue of each UE. Further, the UE status analyzer 1202 transmits an estimated value for the amount of data in each UE to the resource controller 1204.

The resource controller 1204 calculates an ROT to be assigned to a specific UE in consideration of the estimated value for the amount of data in each UE, the channel status, and a target ROT provided from an RNC through a Node B application protocol (NBAP), and determines a maximum allowed data rate to be assigned to the UE in consideration of the priorities of the priority queues of the UE. Further, when the TFC is determined, the size of data which can be transmitted from the UE and an offset of transmission power are determined according to the TFC. The maximum allowed data rate to be assigned to the UE is contained in maximum allowed TFC information 1220 and 1222 and then transmitted to the UE by E-SCCH tx parts 1224 and 1226.

Figure 13:
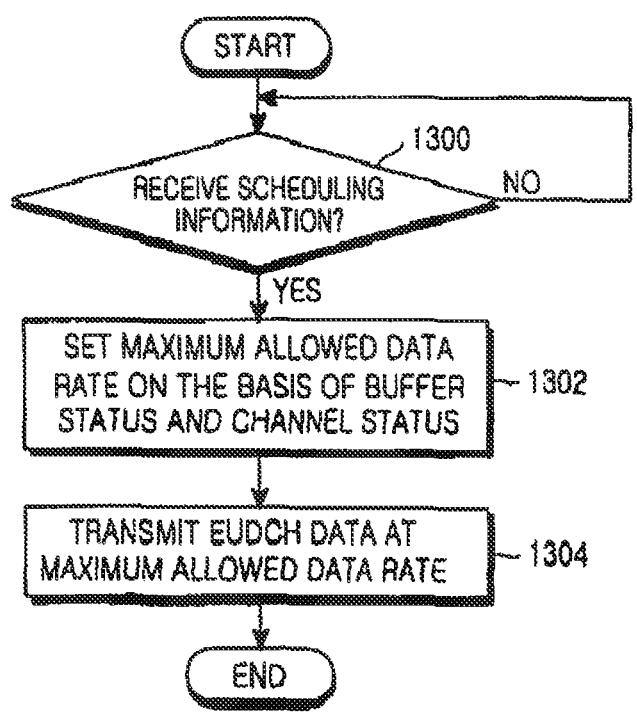
FIG. 13 is a flowchart showing an operation performed in a structure of a logical layer of a Node B according to a preferred embodiment of the present invention.

FIG. 13 is a flowchart showing an operation of a MAC-eu scheduler of a Node B according to a preferred embodiment of the present invention.

Referring to FIG. 13, in step 1300, the scheduler determines whether or not a MAC-eu PDU containing scheduling information has been received from a UE. The scheduling information contains buffer payload information of each UE and information on a priority of each buffer. From the result of the determination, when the scheduling information has been received, step 1302 is performed. In contrast, when the scheduling information has not been received, the process returns to step 1300.

In step 1302, the scheduler determines a maximum allowed data rate to be assigned to the UE on the basis of the buffer status information and the channel status information received from the UE. The maximum allowed data rate is determined in consideration of the target ROT provided from the RNC and a priority of data to be transmitted by the UE. Further, the maximum allowed data rate is transmitted to the UE through a control channel relating to an EUDCH in step 1304.

Figure 14:
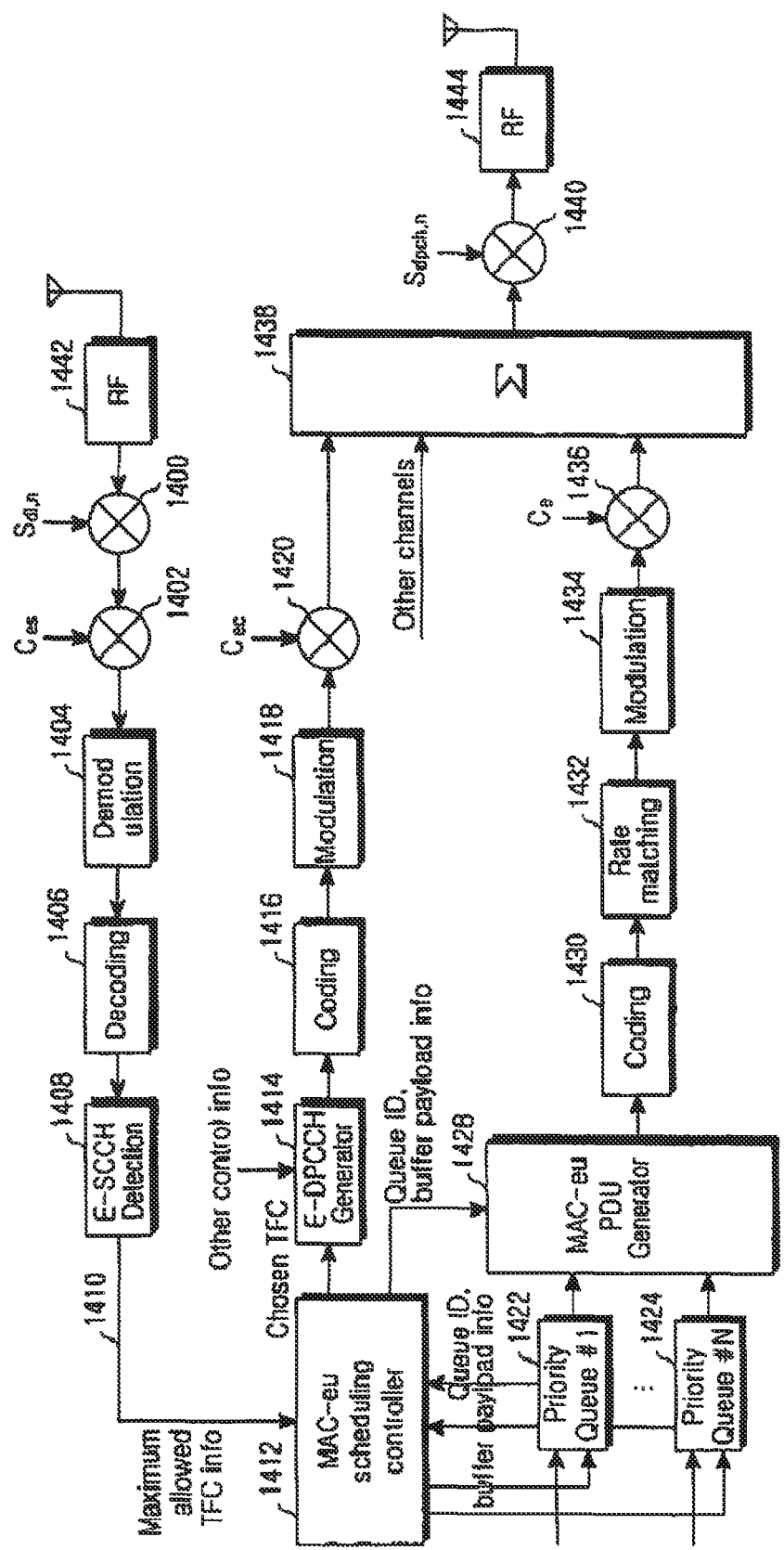
FIG. 14 is a block diagram illustrating a transmission/reception operation performed by a UE according to a preferred embodiment of the present invention.

FIG. 14 is a block diagram illustrating an apparatus for performing a transmission/reception operation by a UE according to a preferred embodiment of the present invention. First, an operation of a reception side receiving scheduling assignment information will be described.

Referring to FIG. 14, a signal received in an antenna passes through a radio frequency (RF) unit 1442, is converted into a baseband signal, and then is inputted to a descrambler 1400. The descrambler 1400 descrambles the baseband signal by a scrambling code $S_{dl,n}$. The descrambled signal is sent to a despreader 1402. In order to perform dechannelization for the descrambled signal, the despreader 1402 multiplies the descrambled signal by a channelization code $C_{es}$, and sends the dechannelized signal to a demodulation unit 1404. The dechannelized signal is demodulated by the demodulation unit 1404 and decoded by a decoding unit 1406. Then, an E-SCCH detection unit 1408 detects the scheduling assignment information from the decoded signal, and the scheduling assignment information contains maximum allowed TFC information 1410 assigned to the UE.

The maximum allowed TFC information 1410 is transmitted to a MAC-eu scheduling controller 1412 and the MAC-eu scheduling controller 1412 determines a TFC by means of the maximum allowed TFC information 1410. The TFC is determined considering information on a priority of data on standby in priority queues 1422 and 1424. For this reason, the priority queues 1422 and 1424 store data relating to one or more services having different priorities, and transmit a QID and buffer payload information to the MAC-eu scheduling controller 1412 periodically or whenever new data is stored. The MAC-eu scheduling controller 1412 transmits information on the determined TFC to an E-DP-CCH generator 1414. The E-DPCCH generator 1414 generates a control signal containing other control information and the TFC. The generated control signal is coded by a coding unit 1416 and the coded signal is modulated by a modulation unit 1418. Then, the modulated signal is subjected to channelization by a spreader 1420 with a channelization code Cec and then is transmitted to a multiplexer 1438.

A MAC-eu PDU generator 1428 performs two functions. First, the MAC-eu PDU generator 1428 includes the QID and the buffer status information sent from the MAC-eu scheduling controller 1412 into a MAC-eu header. Secondly, the MAC-eu PDU generator 1428 appends the MAC-eu header to the data on standby in the priority queues 1422 and 1424 by means of the TFC sent from the MAC-eu scheduling controller 1412, and generates a MAC-eu PDU. The MAC-eu PDU is coded by a coding unit 1430 and rate-matched by a rate matching unit 1432. The rate-matched signal is modulated by a modulation unit 1434 and the modulated signal is subjected to channelization by a spreader 1436 with a channelization code $C_e$. The channel coded data is transmitted to multiplexer 1438. The multiplexer 1438 multiplexes signals provided from the spreaders 1420 and 1436 and signals from other channels. The multiplexed signal is scrambled by a scrambler 1440 with a scrambling code $S_{dpch,n}$ and is converted into an RF signal by an RF unit 1444. Then, the RF signal is transmitted to the Node B through an antenna.

Figure 15:
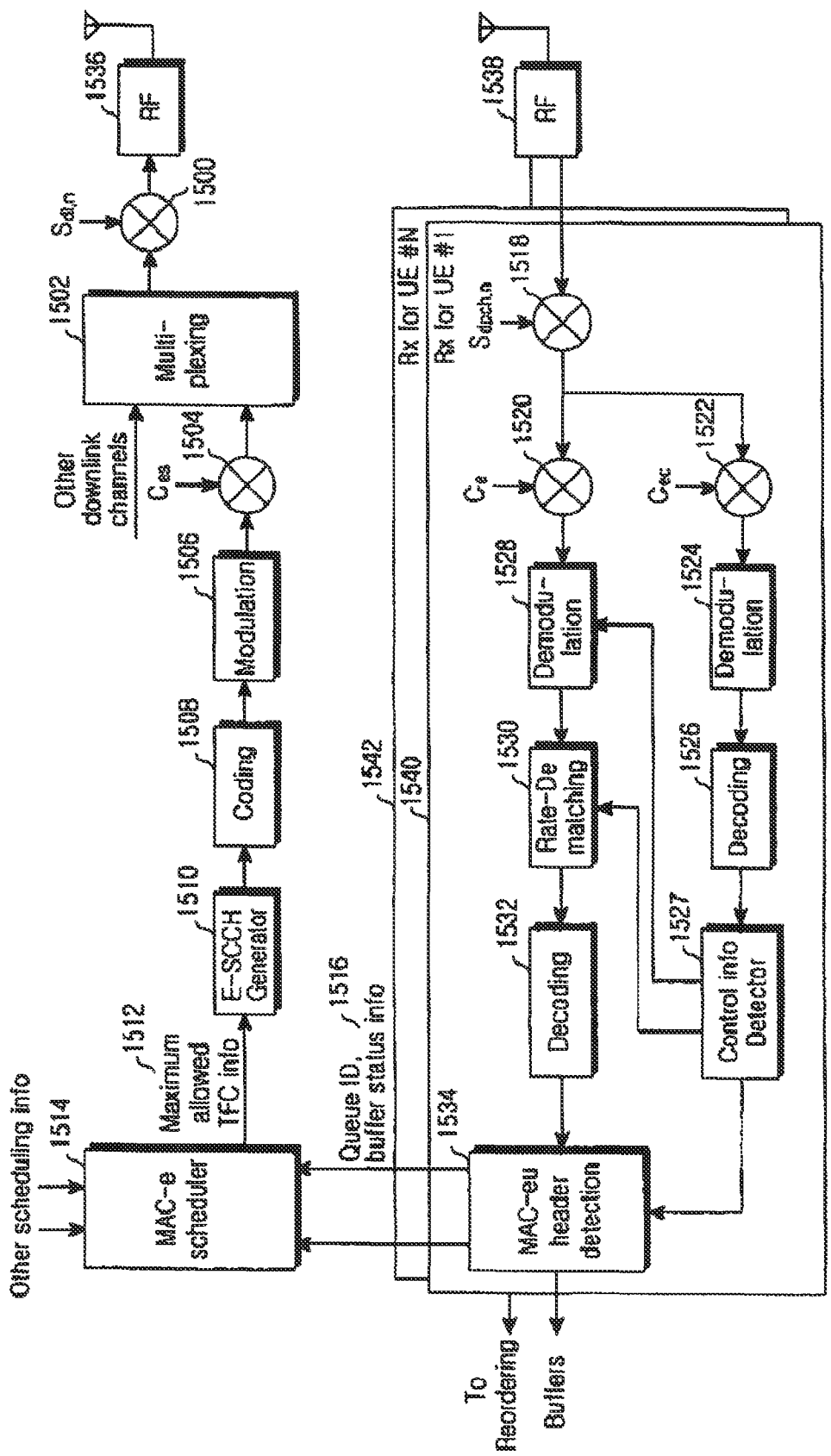
FIG. 15 is a block diagram illustrating a transmission/reception operation performed by a Node B according to a preferred embodiment of the present invention.

FIG. 15 is a block diagram illustrating an apparatus for performing a transmission/reception operation by a Node B according to a preferred embodiment of the present invention. First, an operation of a reception side receiving scheduling information will be described. The reception part of the Node B has N number of reception paths 1540 and 1542 corresponding to each of N number of UEs performing an uplink packet data service. Herein, an operation of the reception path 1540 corresponding to a UE#1 will be described, but it is apparent to those who skilled in the art that the other reception paths also perform the same operations.

Referring to FIG. 15, a signal received in an antenna passes through an RF unit 1538, is converted into a baseband signal, and then is inputted to a descrambler 1518. The descrambler 1518 descrambles the baseband signal by a scrambling code $S_{dpch,n}$. The descrambled signal is sent to despreaders 1520 and 1522 and then is dechannelized into an E-DPCCH signal and an E-DPDCH signal. The E-DP-CCH signal for which channelization has been performed by the despreader 1522 with a channelization code $C_{ec}$ is demodulated by a demodulation unit 1524, and then is decoded by a decoding unit 1526. A control information detector 1527 detects control information necessary in receiving EUDCH data from data decoded by the decoding unit 1526, and the control information contains modulation information, etc., of the EUDCH data.

The E-DPDCH signal for which channelization has been performed by the despreader 1520 with a channelization code $C_e$ is demodulated by a demodulation unit 1528 with the modulation information detected by the control information detection unit 1527.

The demodulated signal is subjected to a rate-dematching by a rate-dematching unit 1530 and then is decoded by a decoding unit 1532.

A MAC-eu header detection unit 1534 separates buffer status information in a header and data in a payload from a MAC-eu PDU sent from the decoding unit 1532. Herein, when a QID map in a MAC-eu header has values other than 0, the MAC-eu header detection unit 1534 detects buffer status information 1516 contained in the MAC-eu header to transmit the detected buffer status information 1516 to a MAC-eu scheduler 1514. Herein, the buffer status information 1516 includes at least one QID and buffer payload information. Further, the MAC-eu header detection unit 1534 separates MAC-eu SDUs, except for the MAC-eu header, from the MAC-eu PDU and transmits the MAC-eu SDUs to reordering buffers of an upper layer. The reordering buffers are located in an RNC, correspond to priority queues of a UE-side, and align received MAC-eu SDUs according to TSNs of the MAC-eu SDUs.

The MAC-eu scheduler 1514 generates a maximum allowed TFC information 1512 for each UE by means of the buffer status information 1516 and other scheduling information, and transmits the generated maximum allowed TFC information 1512 to an E-SCCH generator 1510. The maximum allowed TFC is determined considering a priority of data contained the buffer status information to be transmitted. The E-SCCH generator 1510 generates scheduling assignment information for the maximum allowed TFC information 1512. The scheduling assignment information is coded by a coding unit 1508 and then is modulated by a modulation unit 1506. The signal modulated by the modulation unit 1506 is subjected to channelization by a spreader 1504 with a channelization code $C_{es}$, and then is transmitted to a multiplexer 1502. The multiplexer 1502 multiplexes the received signal together with other downlink channel signals. The multiplexed signal is scrambled by a scrambler 1500 with a scrambling code $S_{dl,n}$ and is converted into an RF signal by an RF unit 1536. Then, the RF signal is transmitted to a UE through an antenna.

As described above, in the present invention, when a UE transmits data having required different priorities through an enhanced uplink channel at the same time, a Node B control scheduling reflects the priorities of the data. For this, the UE transmits buffer status information of a priority queue corresponding to quality of service, and a Node B can perform scheduling by means of the received buffer status information of the priority queue. Accordingly, the present invention provides a differentiated service according to required priorities, thereby satisfying the requirements of users.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for communication between a user equipment (UE) and a node B in a communication system, the method comprising:
generating, by the UE, a media access control protocol data unit (MAC PDU) comprising at least one media access control service data unit (MAC SDU) and at least one field related to an amount of data, wherein each of the at least one field related to the amount of data corresponds to a respective identifier, and the at least one field related to the amount of data is placed prior to the at least one MAC SDU in the MAC PDU;
transmitting the MAC PDU comprising the at least one MAC SDU and the at least one field related to the amount of data to the node B;
receiving grant information from the node B; and
transmitting data to the node B based on the grant information.

2. The method of claim 1, wherein each identifier is associated with a priority.

3. The method of claim 1, wherein at least one identifier is arranged before the at least one field related to the amount of data.

4. The method of claim 1, wherein if one or more fields related to an amount of data are present, each of the one or more fields related to the amount of data are arranged according to respective identifiers corresponding to the one or more fields related to the amount of data.

5. The method of claim 1, wherein the MAC PDU further comprises power information based on a transmission power of the UE.

6. The method of claim 2, wherein the transmitting of the data to the node B is performed based on the priority.

7. A method for communication between a user equipment (UE) and a node B in a communication system, the method comprising:
receiving, by the node B, a media access control protocol data unit (MAC PDU) comprising at least one media access control service data unit (MAC SDU) and at least one field related to an amount of data, wherein each of the at least one field related to the amount of data corresponds to a respective identifier, and the at least one field related to the amount of data is placed prior to the at least one MAC SDU in the MAC PDU;
transmitting grant information to the UE; and
receiving data transmitted from the UE based on the grant information.

8. The method of claim 7, wherein each identifier is associated with a priority.

9. The method of claim 7, wherein at least one identifier is arranged before the at least one field related to the amount of data.

10. The method of claim 7, wherein if one or more fields related to an amount of data are present, each of the one or more fields related to the amount of data are arranged according to respective identifiers corresponding to the one or more fields related to the amount of data.

11. The method of claim 7, wherein the MAC PDU further comprises power information based on a transmission power of the UE.

12. The method of claim 8, wherein the receiving of the data from the UE is performed based on the priority.

13. An apparatus of a user equipment (UE) for communication in a communication system, the apparatus comprising:
a data unit generator configured to generate a media access control protocol data unit (MAC PDU) comprising at least one media access control service data unit (MAC SDU) and at least one field related to an amount of data, wherein each of the at least one field related to the amount of data corresponds to a respective identifier, and the at least one field related to the amount of data is placed prior to the at least one MAC SDU in the MAC PDU;
a transmission unit configured to transmit the MAC PDU comprising the at least one MAC SDU and the at least one field related to the amount of data to a node B, and transmit data to the node B based on grant information received from the node B.

14. The apparatus of claim 13, wherein each identifier is associated with a priority.

15. The apparatus of claim 13, wherein at least one identifier is arranged before the at least one field related to the amount of data.

16. The apparatus of claim 13, wherein if one or more fields related to an amount of data are present, each of the one or more fields related to the amount of data are arranged according to respective identifiers corresponding to the one or more fields related to the amount of data.

17. The apparatus of claim 13, wherein the MAC PDU further comprises power information based on a transmission power of the UE.

18. The apparatus of claim 14, wherein the transmission unit is further configured to transmit the data to the node B based on the priority.

19. An apparatus of a node B for communication in a communication system, the apparatus comprising:
a transmission unit configured to transmit grant information to a user equipment (UE); and
a reception unit configured to receive a media access control protocol data unit (MAC PDU) comprising at least one media access control service data unit (MAC SDU) and at least one field related to an amount of data, wherein each of the at least one field related to the amount of data corresponds to a respective identifier, and the at least one field related to the amount of data is placed prior to the at least one MAC SDU in the MAC PDU, and receive data transmitted from the UE based on the grant information.

20. The apparatus of claim 19, wherein each identifier is associated with a priority.

21. The apparatus of claim 19, wherein at least one identifier is arranged before the at least one field related to the amount of data.

22. The apparatus of claim 19, wherein if one or more fields related to an amount of data are present, each of the one or more fields related to the amount of data are arranged according to respective identifiers corresponding to the one or more fields related to the amount of data.

23. The apparatus of claim 19, wherein the MAC PDU further comprises power information based on a transmission power of the UE.

24. The apparatus of claim 20, wherein the reception unit is further configured to receive the data from the UE based on the priority.

* * * * *